United States Patent
Liu et al.

(10) Patent No.: US 10,204,256 B2
(45) Date of Patent: Feb. 12, 2019

(54) FINGERPRINT SENSOR AND DISPLAY APPARATUS

(71) Applicants: BOE Technology Group Co., Ltd., Beijing (CN); Beijing BOE Optoelectronics Technology Co., Ltd., Beijing (CN)

(72) Inventors: Yingming Liu, Beijing (CN); Xue Dong, Beijing (CN); Haisheng Wang, Beijing (CN); Xiaoliang Ding, Beijing (CN); Shengji Yang, Beijing (CN); Weijie Zhao, Beijing (CN); Hongjuan Liu, Beijing (CN); Changfeng Li, Beijing (CN); Wei Liu, Beijing (CN); Liguang Deng, Beijing (CN); Lei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/511,403

(22) PCT Filed: Apr. 14, 2016

(86) PCT No.: PCT/CN2016/079253
§ 371 (c)(1),
(2) Date: Mar. 15, 2017

(87) PCT Pub. No.: WO2016/180148
PCT Pub. Date: Nov. 17, 2016

(65) Prior Publication Data
US 2017/0286740 A1 Oct. 5, 2017

(30) Foreign Application Priority Data

May 8, 2015 (CN) .......................... 2015 1 0232883

(51) Int. Cl.
*G06K 9/20* (2006.01)
*G06K 9/00* (2006.01)
(Continued)

(52) U.S. Cl.
CPC ........... *G06K 9/0002* (2013.01); *G06F 3/044* (2013.01); *G06F 3/0412* (2013.01)

(58) Field of Classification Search
CPC ........... G06K 9/0002; G06K 9/00013–9/0012
See application file for complete search history.

(56) References Cited

U.S. PATENT DOCUMENTS

| 7,606,398 | B2 * | 10/2009 | Nysæther | G06K 9/0002 382/124 |
| 2003/0165261 | A1 * | 9/2003 | Johansen | G06K 9/0002 382/124 |

(Continued)

FOREIGN PATENT DOCUMENTS

| CN | 101079099 A | 11/2007 |
| CN | 104050465 A | 9/2014 |

(Continued)

OTHER PUBLICATIONS

Second Office Action from Chinese Patent Application No. 201510232883.3, dated May 5, 2016, 10 pages.

(Continued)

*Primary Examiner* — Brian Werner
(74) *Attorney, Agent, or Firm* — Westman, Champlin & Koehler, P.A.

(57) ABSTRACT

The fingerprint sensor includes: at least one driving electrode disposed perpendicularly to a desired direction of movement of a finger; and a plurality of sensing electrodes provided in parallel with each other and disposed perpendicularly to the driving electrode, the plurality of sensing electrodes being not overlapped with the driving electrode;

(Continued)

the number of the driving electrode is less than the number of the sensing electrodes such that each driving electrode corresponds to a plurality of ones of the sensing electrodes.

20 Claims, 2 Drawing Sheets

(51) Int. Cl.
*G06F 3/044* (2006.01)
*G06F 3/041* (2006.01)

(56) References Cited

U.S. PATENT DOCUMENTS

| | | | |
|---|---|---|---|
| 2013/0231046 A1* | 9/2013 | Pope | G06K 9/00013 455/41.1 |
| 2014/0218327 A1 | 8/2014 | Shi et al. | |
| 2016/0171271 A1* | 6/2016 | Lundahl | G06K 9/0002 382/124 |
| 2016/0358003 A1* | 12/2016 | Shen | G06K 9/0002 |

FOREIGN PATENT DOCUMENTS

| | | |
|---|---|---|
| CN | 104318210 A | 1/2015 |
| CN | 104376299 A | 2/2015 |
| CN | 104809448 A | 7/2015 |
| WO | WO-9858342 A1 * 12/1998 | ........... G06K 9/0002 |

OTHER PUBLICATIONS

First Office Action from Chinese Patent Application No. 201510232883. 3, dated Nov. 27, 2015, 12 pages.
International Search Report (English translation) and Written Opinion of International Application No. PCT/CN2016/079253, dated Jul. 12, 2016, 7 pages.
English translation of Box No. V of the Written Opinion for the International Searching Authority for International Application No. PCT/CN2016/079253, 2 pages.

* cited by examiner

FINGERPRINT SENSOR AND DISPLAY APPARATUS

CROSS-REFERENCE TO RELATED APPLICATION

This application is a Section 371 National Stage Application of International Application No. PCT/CN2016/079253, filed on Apr. 14, 2016, entitled "FINGERPRINT SENSOR AND DISPLAY DEVICE", which claims priority to Chinese Application No. 201510232883.3, filed on May 8, 2015, incorporated herein by reference in their entirety.

BACKGROUND

Technical Field

Embodiments of the present disclosure generally relate to display technology, and particularly to a fingerprint sensor and a display apparatus.

Description of the Related Art

Fingerprint is innately and uniquely invariant feature of a human body distinguishing from others. It is composed of a series of ridges and valleys on skin surface of finger tip. These ridges and valleys generally contain details including ridge bifurcations, ridge ends, arches, tented arches, left-handed spiral, right-handed spiral, double spirals or the like, which determine uniqueness of the fingerprint pattern. Fingerprint recognition technology developed from this is used earlier as personal identity verification technology. Based on different ways of fingerprint acquisitions and input, widely used and best known fingerprint identification technologies currently include: optical imaging, thermal sensor and infrared sensor, etc.

In practical application, fingerprint data is acquired in parts during a fingerprint reading process, so many times of data acquisitions should be implemented in fingerprint verification, which is complicated and tedious. Accordingly, it is a technical problem to be solved urgently that how to achieve data acquisition in fewer times or to acquire all data in one time, or to implement many times of data acquisition within the same period of time, so as to improve accuracy.

SUMMARY

In order to solve at least one of the abovementioned and other problems and defects existing in conventional fingerprint sensors, the present disclosure provides a fingerprint sensor and a display apparatus with a higher sensitivity.

According to an aspect of the present disclosure, there is provided a fingerprint sensor comprising:

at least one driving electrode disposed perpendicularly to a desired direction of movement of a finger;

a plurality of sensing electrodes provided in parallel with each other and disposed perpendicularly to the driving electrode, the plurality of sensing electrodes being not overlapped with the driving electrode; the number of the driving electrode is less than the number of the sensing electrodes such that each driving electrode corresponds to a plurality of ones of the sensing electrodes.

In one embodiment, every two adjacent one of the sensing electrodes in a row direction constitutes one sensing electrode pair, in which one is a first sensing electrode and the other is a second sensing electrode; the fingerprint sensor further comprises: a plurality of phase inverters and a plurality of differential amplifiers;

one of the first sensing electrode and the second sensing electrode of each said sensing electrode pair is connected to an input end of one of the phase inverters and the other is connected to a forward input end of one of the differential amplifiers, and, an output end of the one of the phase inverters is connected to an inverted input end of the one of the differential amplifiers.

In one embodiment, one first shielding electrode is disposed between every two adjacent sensing electrode pairs.

In one embodiment, an electric potential at the first shielding electrode is 0 V.

In one embodiment, the fingerprint sensor comprises two driving electrodes including a first driving electrode and a second driving electrode; the plurality of sensing electrodes are divided into two groups including a first sensing electrode group and a second sensing electrode group; each of the sensing electrodes of the first sensing electrode group is configured for receiving a sensing signal corresponding to a driving signal applied on the first driving electrode and is disposed between the first driving electrode and the second driving electrode; and each of the sensing electrodes of the second sensing electrode group is configured for receiving a sensing signal corresponding to a driving signal applied on the second driving electrode and is disposed at a side of the second driving electrode away from the first sensing electrode group.

In one embodiment, the number of the sensing electrodes of the first sensing electrode group is greater than the number of the sensing electrodes of the second sensing electrode group.

In one embodiment, the fingerprint sensor further comprises a processing unit configured to capture and calculate a time difference when the finger scrapes from the first sensing electrode group to the second sensing electrode group, so as to determine a scraping speed of the finger.

In one embodiment, one second shielding electrode is disposed at a side of the first driving electrode away from the first sensing electrode group, and, another second shielding electrode is disposed between the second driving electrode and the first sensing electrode group.

In one embodiment, electric potentials at the second shielding electrodes are each 0 V.

In one embodiment, the fingerprint sensor further comprises a sensor chip electrically connected to the sensing electrodes and the driving electrode so as to supply the driving electrode with a signal and to receive signals from the sensing electrodes.

According to another aspect of the present disclosure, there is provided a display apparatus comprising a touch panel and the abovementioned fingerprint sensor.

In one embodiment, the touch panel comprises a sensing electrode and a driving electrode, and wherein the sensing electrodes of the fingerprint sensor and the sensing electrode of the touch panel are disposed in the same layer and made of the same material; and the driving electrode of the fingerprint sensor and the driving electrode of the touch panel are disposed in the same layer and made of the same material.

In one embodiment, the sensor chip is bonded to the touch panel by using a conductive double-sided adhesive tape.

DETAILED DESCRIPTION OF THE EMBODIMENTS

In order to provide a better understanding of technique solutions of the present disclosure, the present disclosure will be further described hereinafter in detail in conjunction with exemplary embodiments and with reference to the drawings.

Figure 1:
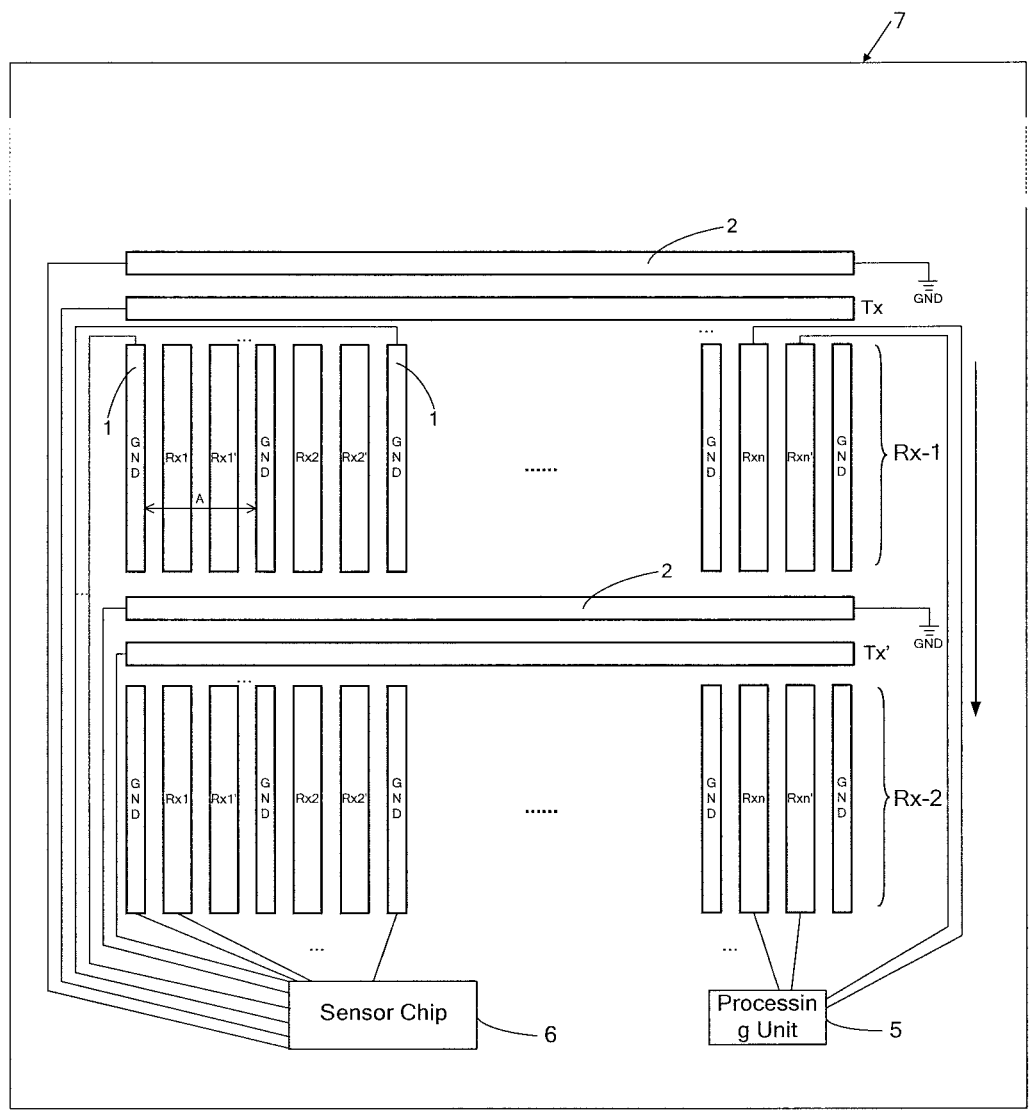
FIG. 1 is a schematic view showing an arrangement of a fingerprint sensor according to an exemplary embodiment of the present disclosure.
Figure 2:
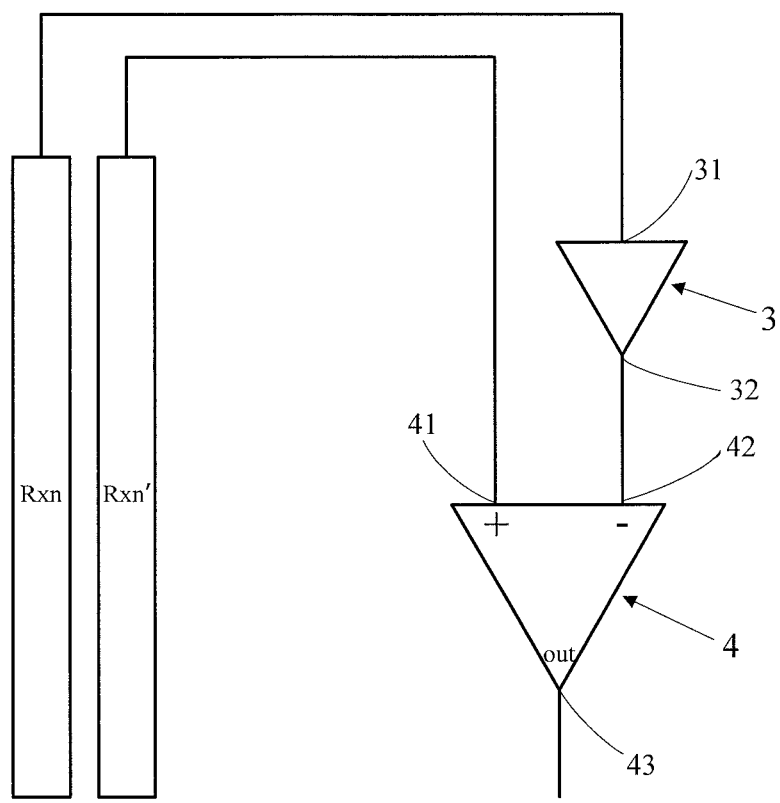
FIG. 2 is a schematic view showing an arrangement for noise elimination according to an exemplary embodiment of the present disclosure.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. Referring to FIGS. 1 and 2, in an embodiment of the present disclosure, there is provided a fingerprint sensor comprising: at least one driving electrode (for example, Tx and Tx') disposed perpendicularly to a desired direction of a finger movement; a plurality of sensing electrodes (for example, Rxn and Rxn', which are able to detect positions of ridges and valleys of the fingerprint) provided in parallel with each other and disposed perpendicularly to the driving electrode, the plurality of sensing electrodes being not overlapped with the driving electrode; in an example, the number of the driving electrode is less than the number of the sensing electrodes such that each driving electrode corresponds to a plurality of ones of the sensing electrodes. As shown in FIG. 1, the driving electrode Tx corresponds to a plurality of sensing electrodes Rxn, Rxn' located therebelow, and the driving electrode Tx' also corresponds to a plurality of sensing electrodes Rxn, Rxn' located therebelow.

In the fingerprint sensor according to embodiments of the present disclosure, the number of the driving electrode is less than the number of the sensing electrodes, that is to say, one driving electrode corresponds to a plurality of sensing electrodes. Accordingly, once one driving electrode is applied with a driving signal, an electrical field is generated between the driving electrode and a plurality of corresponding sensing electrodes, and the plurality of corresponding sensing electrodes will receive a sensing signal which is caused by a touch action of a finger and corresponds to this driving signal, thereby the sensitivity of the fingerprint sensor can be greatly improved.

In an embodiment, referring to FIG. 2, every two adjacent ones of the sensing electrodes in a row direction constitute one sensing electrode pair, in which one is a first sensing electrode Rxn and the other is a second sensing electrode Rxn', where n is an integer that is greater than or equal to one. The fingerprint sensor further comprises: a plurality of phase inverters 3 and a plurality of differential amplifiers 4; one of each pair of sensing electrodes (the first sensing electrode Rxn and the second sensing electrode Rxn') is electrically connected to an input end 31 of one of the phase inverters 3 and the other is electrically connected to a forward or positive input end 41 of one of the differential amplifiers 4, and, an output end 32 of the one of the phase inverters 3 is electrically connected to an inverted or negative input end 42 of the one of the differential amplifiers 4. With this configuration, noises in the first sensing electrode Rxn and the second sensing electrode Rxn' can be eliminated.

The reason for this configuration is described as follows. A certain noise will occur when the sensing signals corresponding to the driving signal at the driving electrode are received by the first sensing electrode Rxn and the second sensing electrode Rxn' of each pair of sensing electrodes; moreover, capacitances of the electrodes Rxn and Rxn' formed with respect to the ground are the same as and sensing capacitances of the electrodes Rxn and Rxn' formed with respect to the finger are the same, noises generated by the electrode Rxn and Rxn', which receive the signals simultaneously, will be the same; in this case, the signal from the first sensing electrode Rxn will be inverted in phase by the phase inverter 3 if the first sensing electrode Rxn is connected to the phase inverter 3, while the noise from the first sensing electrode Rxn will not be inverted in phase by the phase inverter 3; then subtraction between the signal, that is inverted in phase by the phase inverter 3, from the first sensing electrode Rxn and the signal from the second sensing electrode Rxn' is implemented in the differential amplifier 4; as a result, the noise from the first sensing electrode Rxn and the noise from the second sensing electrode Rxn' will cancel out each other, while the signal from the first sensing electrode Rxn and the signal from the second sensing electrode Rxn' will be superposed one another.

In one embodiment, one first shielding electrode 1 is disposed between adjacent sensing electrode pairs.

That is to say, one first shielding electrode 1 is provided one either side of each pair of sensing electrodes. The first shielding electrode 1 is used to shield signals of any two adjacent sensing electrode pairs, so as to prevent occurrence of signal interference between the sensing electrode pairs, which will otherwise adversely affect performance of the fingerprint sensor.

In an example, an electric potential at the first shielding electrode 1 is 0 V. It should be understood that, when the electric potential applied at the first shielding electrode 1 is 0 V, that is, when the first shielding electrode 1 is grounded, no electric field will be created between any two adjacent sensing electrode pairs, so as to prevent occurrence of signal interference between the sensing electrode pairs, which will otherwise adversely affect performance of the fingerprint sensor.

As one implementation of the present embodiment, referring to FIG. 1, the fingerprint sensor comprises two driving electrodes, namely, a first driving electrode Tx and a second driving electrode Tx'. The plurality of sensing electrodes are divided into two groups, namely a first sensing electrode group Rx-1 and a second sensing electrode group Rx-2; in an example, each of the sensing electrodes of the first sensing electrode group Rx-1 is used for receiving a sensing signal which is cause by a touch action of the finger and corresponds to a driving signal applied on the first driving electrode Tx; and, each of the sensing electrodes of the second sensing electrode group Rx-2 is used for receiving a sensing signal which is cause by a touch action of the finger and corresponds to a driving signal applied on the second driving electrode Tx'.

Specifically, referring to FIG. 1, the first sensing electrode group and a second sensing electrode group each comprises a plurality of sensing electrode pairs, and one first shielding electrode 1 is disposed between any two adjacent sensing electrode pairs. Distance between two first shielding electrodes 1 disposed in the same row is generally 25 µm (that is, width of "A" shown in FIG.). Widths of the first sensing electrode Rxn and the second sensing electrode Rxn' in each of the sensing electrode pairs are the same, about 6 µm. And, a distance between the first sensing electrode Rxn and the second sensing electrode Rxn' and a distance from either of the first sensing electrode Rxn and the second sensing electrode Rxn' to its respective nearest first shielding electrode 1 are the same, also about 6 μm.

Once a finger is sliding through the fingerprint sensor from top to bottom (that is, the direction indicated by the arrow shown on right side of FIG. 1), the finger first scrapes and slides through the first sensing electrode group, at this moment, the first sensing electrode Rxn and the second sensing electrode Rxn' of each of the sensing electrode pairs of the first sensing electrode group receive simultaneously sensing signals corresponding to the signal from the first driving electrode Tx. Since sizes of the first sensing electrode Rxn and the second sensing electrode Rxn' of each of the sensing electrode pairs are the same, grounded capacitances of the first sensing electrode Rxn and the second sensing electrode Rxn' of each of the sensing electrode pairs are the same, and the sensing capacitances of the first sensing electrode Rxn and the second sensing electrode Rxn' formed with respect to the finger are the same. Thus, noises generated in the first sensing electrode Rxn and the second sensing electrode Rxn' during the sliding and scraping are the same. Here, the signal from the first sensing electrode Rxn will be inverted in phase if the first sensing electrode Rxn is connected to the phase inverter 3, while the noise from the first sensing electrode Rxn will not be inverted in phase by the phase inverter 3; then subtraction between the signal, that is inverted in phase by the phase inverter 3, from the first sensing electrode Rxn and the signal from the second sensing electrode Rxn' is implemented in the differential amplifier 4; as a result, the noise from the first sensing electrode Rxn and the noise from the second sensing electrode Rxn' will cancel out each other, while the useful signal from the first sensing electrode Rxn and the useful signal from the second sensing electrode Rxn' will be superposed one another.

Next, once the finger is sliding on and scraping the second sensing electrode group, the sensing electrodes of the second sensing electrode group at this moment will receive sensing signals which correspond to the driving signal from the second driving electrode Tx', and meanwhile, the sensing electrodes of the second sensing electrode group will be used such that time differences between them and respective sensing electrodes of the first sensing electrode group are captured, so as to determine a fingerprint movement speed of the fingerprint during the scraping, thereby combining uniformly fingerprint patterns with different scraping speeds together (namely, to unify the fingerprint patterns).

Exemplarily, the second sensing electrode group is only used for determining a scraping speed of the finger, and accordingly, the sensing electrodes in the second sensing electrode group are not necessarily so many. In other words, for example, the number of the sensing electrodes of the first sensing electrode group may be greater than the number of the sensing electrodes of the second sensing electrode group.

In an example, the fingerprint sensor further comprises a processing unit 5 configured to capture and calculate a time difference when the finger slides or scrapes from the first sensing electrode to the second sensing electrode, so as to determine a scraping speed of the finger. Exemplarily, the processing unit 5 is electrically connected with or in signal communication with respective sensing electrodes of the first sensing electrode group Rx-1 and the second sensing electrode group Rx-2.

In an example, in the abovementioned fingerprint sensor, second shielding electrodes 2 are respectively disposed at a side of the first driving electrode Tx away from the first sensing electrode group and at a side of the second driving electrode Tx' away from the first sensing electrode group, as shown in FIG. 1.

Furthermore, electric potentials at the abovementioned second shielding electrodes 2 are 0 V.

In one embodiment of the present disclosure, the sensing electrodes of the fingerprint sensor and sensing electrodes of a touch panel are disposed in the same layer and are made of the same material; and, the driving electrode of the fingerprint sensor and driving electrodes of the touch panel are disposed in the same layer and are made of the same material.

Specifically, in the present embodiment, the sensing electrodes and the driving electrode of the fingerprint sensor are disposed in the same layer. Accordingly, it should be understood that the sensing electrodes and the driving electrode of the touch panel are also disposed in the same layer so as to facilitate thinning of the touch panel, and also are disposed in the same layer as and are made of same material as the driving electrodes of the fingerprint sensor. As a result, process steps can be reduced and production cost can be greatly saved.

In an embodiment, the fingerprint sensor further comprises a sensor chip 6 electrically connected to the sensing electrodes Rxn, Rxn' and the driving electrodes Tx, Tx'. That is to say, the sensor chip is used to supply the driving electrode of the fingerprint sensor with a signal and to receive signals from the sensing electrodes, thereby achieving simple wiring. As an example, the processing unit may be integrated into the sensor chip.

In an example, the sensor chip is bonded to the touch panel 7 by using a conductive double-sided adhesive tape. Bonding by the conductive double-sided adhesive tape is simple in process and easy to operate.

In the fingerprint sensor according to embodiments of the present disclosure, the number of the driving electrodes is less than the number of the sensing electrodes, that is, one driving electrode corresponds to a plurality of sensing electrodes, and accordingly, once one driving electrode is applied with a driving signal, a plurality of sensing electrodes will receive sensing signals corresponding to the driving signal, which can greatly improve sensitivity of the fingerprint sensor.

In a further embodiment of the present disclosure, there is provided a display apparatus comprising the fingerprint sensor described in the above embodiments. Accordingly, the display apparatus according to the present embodiment is high in touch sensitivity.

The display apparatus can be any products or components having a display function, for example, a mobile phone, a tablet computer, a TV, a display, a notebook computer, a digital photo frame, a navigator, etc.

Of course, the display apparatus according to the present embodiment may further comprises other conventional structures, including power supply unit, display driver unit, etc.

It should be understood that the abovementioned embodiments are merely exemplary embodiments used to illustrate principle of the present disclosure, but not to limit the present disclosure. Various changes and modifications can be made without departing from principle and spirit of the present disclosure, and these changes and modifications should be regarded as be included within the scopes of the present invention.

What is claimed is:

1. A fingerprint sensor, comprising:
   at least one driving electrode disposed perpendicularly to a desired direction of movement of a finger; and
   a plurality of sensing electrodes provided in parallel with each other and disposed perpendicularly to the driving electrode, the plurality of sensing electrodes being not overlapped with the driving electrode;
   wherein the number of the driving electrode is less than the number of the sensing electrodes such that each driving electrode corresponds to a plurality of ones of the sensing electrodes;
   every two adjacent ones of the sensing electrodes in a row direction constitutes one sensing electrode pair, in which one is a first sensing electrode and the other is a second sensing electrode;
   the fingerprint sensor further comprises a plurality of phase inverters and a plurality of differential amplifiers;
   one of the first sensing electrode and the second sensing electrode of each said sensing electrode pair is connected to an input end of one of the phase inverters and the other is connected to a forward input end of one of the differential amplifiers, and an output end of the one of the phase inverters is connected to an inverted input end of the one of the differential amplifiers.

2. The fingerprint sensor of claim 1, wherein, one first shielding electrode is disposed between every two adjacent sensing electrode pairs.

3. The fingerprint sensor of claim 2, wherein, an electric potential at the first shielding electrode is 0 V.

4. The fingerprint sensor of claim 1, wherein,
   the fingerprint sensor comprises two driving electrodes including a first driving electrode and a second driving electrode;
   the plurality of sensing electrodes are divided into two groups including a first sensing electrode group and a second sensing electrode group;
   each of the sensing electrodes of the first sensing electrode group is configured for receiving a sensing signal corresponding to a driving signal applied on the first driving electrode and is disposed between the first driving electrode and the second driving electrode; and
   each of the sensing electrodes of the second sensing electrode group is configured for receiving a sensing signal corresponding to a driving signal applied on the second driving electrode and is disposed at a side of the second driving electrode away from the first sensing electrode group.

5. The fingerprint sensor of claim 4, wherein, the number of the sensing electrodes of the first sensing electrode group is larger than the number of the sensing electrodes of the second sensing electrode group.

6. The fingerprint sensor of claim 4, wherein, the fingerprint sensor further comprises a processor configured to capture and calculate a time difference when the finger scrapes from the first sensing electrode group to the second sensing electrode group, so as to determine a scraping speed of the finger.

7. The fingerprint sensor of claim 4, wherein, one second shielding electrode is disposed at a side of the first driving electrode away from the first sensing electrode group, and, another second shielding electrode is disposed between the second driving electrode and the first sensing electrode group.

8. The fingerprint sensor of claim 7, wherein, electric potentials at the second shielding electrodes are each 0 V.

9. The fingerprint sensor of claim 1, wherein, the fingerprint sensor further comprises a sensor chip electrically connected to the sensing electrodes and the driving electrode so as to supply the driving electrode with a signal to receive signals from the sensing electrodes.

10. A display apparatus, comprising a touch panel, wherein, the display apparatus further comprises the fingerprint sensor of claim 1.

11. The display apparatus of claim 10, wherein the touch panel comprises a sensing electrode and a driving electrode, and wherein, the sensing electrodes of the fingerprint sensor and the sensing electrode of the touch panel are disposed in the same layer and made of the same material; and the driving electrode of the fingerprint sensor and the driving electrode of the touch panel are disposed in the same layer and made of the same material.

12. The display apparatus of claim 10, wherein, the fingerprint sensor further comprises a sensor chip electrically connected to the sensing electrodes and the driving electrode so as to supply the driving electrode with a signal to receive signals from the sensing electrodes.

13. The display apparatus of claim 12, wherein, the sensor chip is bonded to the touch panel by using a conductive double-sided adhesive tape.

14. The fingerprint sensor of claim 1, wherein,
   the fingerprint sensor comprises two driving electrodes including a first driving electrode and a second driving electrode;
   the plurality of sensing electrodes are divided into two groups including a first sensing electrode group and a second sensing electrode group;
   each of the sensing electrodes of the first sensing electrode group is configured for receiving a sensing signal corresponding to a driving signal applied on the first driving electrode and is disposed between the first driving electrode and the second driving electrode; and
   each of the sensing electrodes of the second sensing electrode group is configured for receiving a sensing signal corresponding to a driving signal applied on the second driving electrode and is disposed at a side of the second driving electrode away from the first sensing electrode group.

15. The fingerprint sensor of claim 2, wherein,
   the fingerprint sensor comprises two driving electrodes including a first driving electrode and a second driving electrode;
   the plurality of sensing electrodes are divided into two groups including a first sensing electrode group and a second sensing electrode group;
   each of the sensing electrodes of the first sensing electrode group is configured for receiving a sensing signal corresponding to a driving signal applied on the first driving electrode and is disposed between the first driving electrode and the second driving electrode; and
   each of the sensing electrodes of the second sensing electrode group is configured for receiving a sensing signal corresponding to a driving signal applied on the second driving electrode and is disposed at a side of the second driving electrode away from the first sensing electrode group.

16. The fingerprint sensor of claim 3, wherein,
   the fingerprint sensor comprises two driving electrodes including a first driving electrode and a second driving electrode;
   the plurality of sensing electrodes are divided into two groups including a first sensing electrode group and a second sensing electrode group;

each of the sensing electrodes of the first sensing electrode group is configured for receiving a sensing signal corresponding to a driving signal applied on the first driving electrode and is disposed between the first driving electrode and the second driving electrode; and each of the sensing electrodes of the second sensing electrode group is configured for receiving a sensing signal corresponding to a driving signal applied on the second driving electrode and is disposed at a side of the second driving electrode away from the first sensing electrode group.

17. The fingerprint sensor of claim 14, wherein, the number of the sensing electrodes of the first sensing electrode group is larger than the number of the sensing electrodes of the second sensing electrode group.

18. The fingerprint sensor of claim 14, wherein, the fingerprint sensor further comprises a processor configured to capture and calculate a time difference when the finger scrapes from the first sensing electrode group to the second sensing electrode group, so as to determine a scraping speed of the finger.

19. The fingerprint sensor of claim 14, wherein, one second shielding electrode is disposed at a side of the first driving electrode away from the first sensing electrode group, and, another second shielding electrode is disposed between the second driving electrode and the first sensing electrode group.

20. A fingerprint sensor, comprising:

at least one driving electrode disposed perpendicularly to a desired direction of movement of a finger; and a plurality of sensing electrodes provided in parallel with each other and disposed perpendicularly to the driving electrode, the plurality of sensing electrodes being not overlapped with the driving electrode;

wherein, the number of the driving electrode is less than the number of the sensing electrodes such that each driving electrode corresponds to a plurality of ones of the sensing electrodes;

the fingerprint sensor comprises two driving electrodes including a first driving electrode and a second driving electrode;

the plurality of sensing electrodes are divided into two groups including a first sensing electrode group and a second sensing electrode group;

each of the sensing electrodes of the first sensing electrode group is configured for receiving a sensing signal corresponding to a driving signal applied on the first driving electrode and is disposed between the first driving electrode and the second driving electrode; and each of the sensing electrodes of the second sensing electrode group is configured for receiving a sensing signal corresponding to a driving signal applied on the second driving electrode and is disposed at a side of the second driving electrode away from the first sensing electrode group.

* * * * *